(12) United States Patent
Olson (10) Patent No.: US 7,023,469 B1
(45) Date of Patent: Apr. 4, 2006

(54) AUTOMATIC VIDEO MONITORING SYSTEM WHICH SELECTIVELY SAVES INFORMATION

(75) Inventor: Thomas J. Olson, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 444 days.

(21) Appl. No.: 09/292,265

(22) Filed: Apr. 15, 1999

Related U.S. Application Data (60) Provisional application No. 60/083,718, filed on Apr. 30, 1998.

(51) Int. Cl.
H04N 7/18 (2006.01)

(52) U.S. Cl. .................... 348/152; 348/143; 348/154

(58) Field of Classification Search ................ 348/152, 348/154, 143, 700; 382/104; 379/40; 707/218; 340/565; 701/207; 345/474
See application file for complete search history.

(56) References Cited

U.S. PATENT DOCUMENTS

| | | | | |
|---|---|---|---|---|
| 4,249,207 A | * | 2/1981 | Harman et al. | ............. 348/152 |
| 4,943,854 A | | 7/1990 | Shiota et al. | ................ 358/108 |
| 5,111,291 A | | 5/1992 | Erickson et al. | ............. 358/108 |
| 5,289,275 A | * | 2/1994 | Ishii et al. | .................... 348/154 |
| 5,425,139 A | * | 6/1995 | Williams et al. | ............. 345/474 |
| 5,467,402 A | * | 11/1995 | Okuyama et al. | ............ 382/104 |
| 5,491,511 A | | 2/1996 | Odle | .......................... 349/153 |
| 5,572,643 A | * | 11/1996 | Judson | ........................ 709/218 |
| 5,943,394 A | * | 8/1999 | Ader et al. | ..................... 379/40 |
| 5,961,571 A | * | 10/1999 | Gorr et al. | ................... 701/207 |
| 5,966,074 A | * | 10/1999 | Baxter | .......................... 340/565 |
| 5,969,755 A | * | 10/1999 | Courtney | ..................... 348/143 |
| 6,049,363 A | * | 4/2000 | Courtney et al. | ........... 348/700 |
| 6,069,655 A | * | 5/2000 | Seeley et al. | ................ 348/154 |

OTHER PUBLICATIONS

U.S. Appl. No. 08/795,423, filed Feb. 5, 1997.
U.S. Appl. No. 08/866,789, filed May 30, 1997.
Jonathan D. Courtney, "Automatic Video Indexing via Object Motion Analysis", *Pattern Recognition*, Apr., 1997, cover page and pp 1-31.
Niyogi, et al., "Analyzing and Recognizing Walking Figures in XYT", 1994 IEEE, pp. 469-474.

(Continued)

*Primary Examiner*—Allen Wong
(74) *Attorney, Agent, or Firm*—Robert D. Marshall, Jr.; W. James Brady, III; Frederick J. Telecky, Jr.

(57) ABSTRACT

A system (10) for automatically monitoring an area includes a camera unit (12) having therein a video camera (23) and an image processing section (27). The image processing section saves a reference image from the video camera, compares subsequent images to the reference image, and detects and tracks change regions in the subsequent images. For each change region, the image processing section saves a path of movement of the change region, and a selected image of the change region. Selection is carried out so as to optimize the selected image, for example so that a detected person is facing and close to the video camera. The camera unit is network-ready (14), so that a remote workstation (13) can access the images and other information saved in the camera unit.

28 Claims, 6 Drawing Sheets

OTHER PUBLICATIONS

Wren, et al., "Pfinder: Real-Time Tracking of the Human Body", M.I.T. Media Laboratory Perceptual Computing Section Technical Report No. 353, published in SPIE 1995 vol. 2615, pp. 1-9.

Turk, et al., "Eigenfaces for Recognition", 1991 Massachusetts Institute of Technology, Journal of Cognitive Neuroscience vol. 3, No. 1, pp. 71-86.

Flinchbaugh, et al., "Autonomous Scene Monitoring System", pp. 205-209.

Norris, et al., "Algorithmic Surveillance—The future of automated visual surveillance", CCTV, Surveillance and Social Control Conference, Jul. 9, 1996, pp. 1-21.

Jonathan D. Courtney, "Automatic Object-Based Indexing for Assisted Analysis of Video Data", (1995) pp. 1-25.

Bruce Flinchbaugh, "Robust Video Motion Detection and Event Recognition", May 11, 1997, pp. 51-54.

Kashi Rao, "A Computer Vision System to Detect 3-D Rectangular Solids", 6 unnumbered pages.

Jain, et al., "Segmentation through the Detection of Changes Due to Motion", Computer Graphics and Image Processing 11, (1979), pp. 13-34.

"DTS-1000 DTS-1000VB Video Motion Detection & Tracking System" Stellar Products Incorporated, 4 unnumbered pages, 1995.

Olson, et al., "Moving Object Detection and Event Recognition Algorithms for Smart Cameras", May 11, 1997, pp. 159-175.

* cited by examiner

AUTOMATIC VIDEO MONITORING SYSTEM WHICH SELECTIVELY SAVES INFORMATION

This application claims priority under 35 USC §119(e)(1) of Provisional Application No. 60/083,718, filed Apr. 30, 1998.

TECHNICAL FIELD OF THE INVENTION

This invention relates in general to automatic monitoring systems and, more particularly, to an automatic video monitoring system that selectively saves information derived from video images of a monitored area.

BACKGROUND OF THE INVENTION

Surveillance cameras are widely used as an aid in providing physical security for employees and property, such as commercial, industrial and government facilities. In many instances, the images from the camera are simply viewed in real-time by security guards.

It is also common to record the output of each camera on a time-lapse video cassette recorder (VCR). In the event of a problem or security incident, the resulting recording can then be examined. It is also possible to use a video or infrared motion detector, so that the VCR does not record anything except when there is motion in the observed area. This reduces the consumption of tape and makes it easier to find footage of interest. Nevertheless, it does not eliminate the need for the VCR, which is a relatively complex and expensive component that is subject to mechanical failure and that requires periodic maintenance, such as cleaning of the video heads. Moreover, infrared motion detectors have a tendency to produce false detections.

Another known approach is to use an all-digital video imaging system, which converts each video image to a compressed digital form immediately upon capture. The digital data is then saved in a conventional database (such as a disk farm backed up by a tape juke box). This approach is relatively expensive, requires a substantial amount of storage space, and does nothing to help an operator find frames of interest.

Another approach uses a video camera and personal computer to detect and track people, and saves the first image that satisfies some alarm condition. However, this system makes no attempt to select a good view of the person, as a result of which the saved image may show the person with his or her back to the camera, rendering it difficult or impossible to identify the particular person. Another known system displays a path of movement of a detected person who is in the observed area, but discards the path of movement after the person leaves the observed area.

All of these known approaches have been generally adequate for their intended purposes, but they have not been satisfactory in all respects. For example, they involve hardware which is relatively expensive and not particularly compact. They often use a VCR, which is subject to mechanical failure and requires periodic maintenance. Some systems store all incoming video information, which uses a substantial amount of storage capacity, and makes it difficult to find of events of interest.

SUMMARY OF THE INVENTION

From the foregoing, it may be appreciated that a need has arisen in the automatic monitoring field for a method and apparatus which are reliable, which intelligently save selected information that is meaningful but minimizes storage capacity, and which facilitate the location and review by an operator of events of interest. As to the apparatus, there is a need for physical compactness and low cost.

According to one form of the present invention, a method and apparatus are provided to address this need, and involve periodically detecting an image of the area, identifying and tracking a moving object in a succession of the detected images, automatically selecting an image of each identified object, and saving the selected image of each identified object.

A different form of the present invention involves periodically detecting an image of the area, identifying and tracking a moving object in a succession of the detected images, and automatically saving information which identifies the path and movement of the object, the information being retained after the object is no longer present in the detected images.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
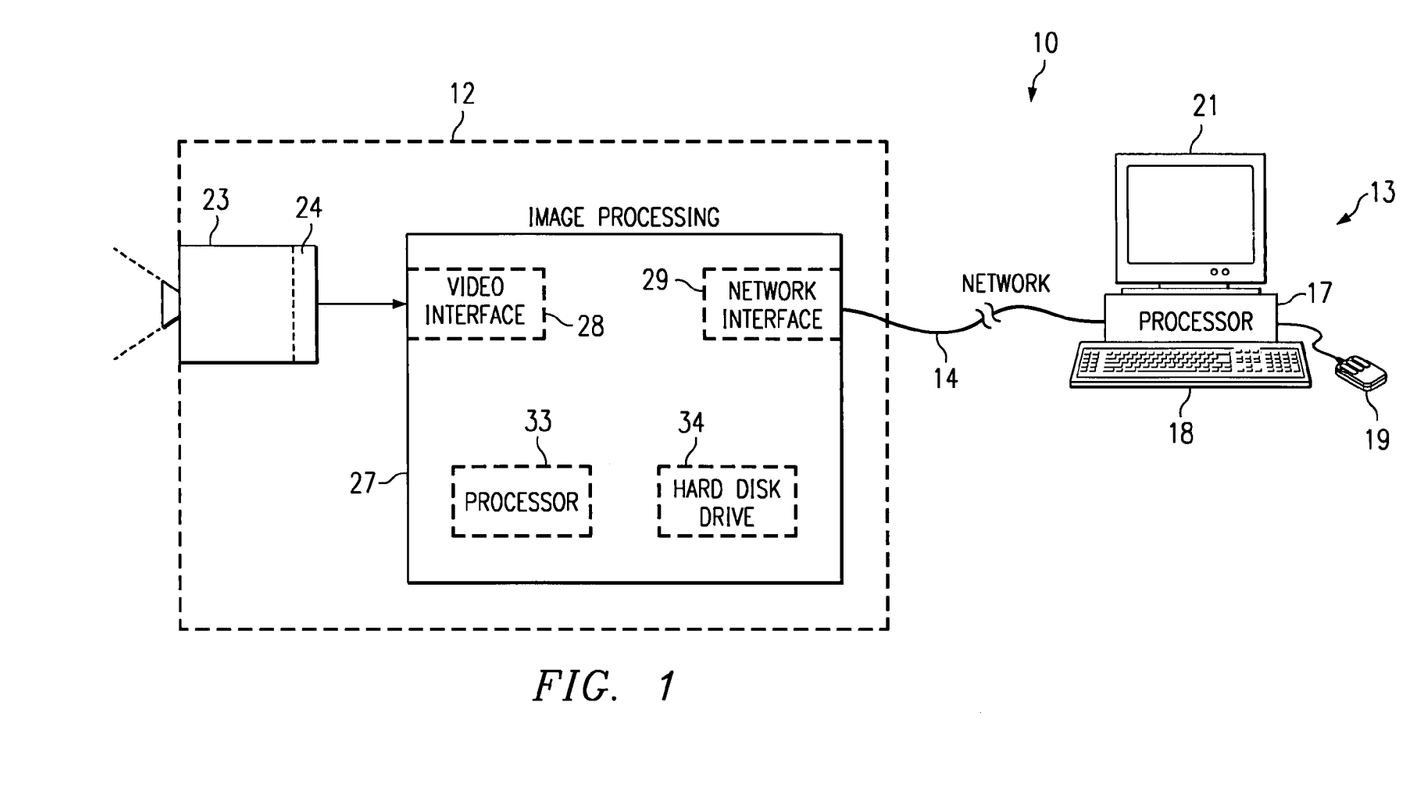
FIG. 1 is a diagrammatic view of an automatic monitoring system which embodies the present invention.

FIG. 1 is a diagrammatic view of a monitoring system 10 which embodies the present invention, and which is used to monitor activity in a selected region or area. The monitoring system 10 includes a camera unit 12 and a workstation 13, which are operatively coupled through a network shown diagrammatically at 14. The network 14 may be a local area network, the Internet, some other type of network, a modem link, or a combination of such technologies. The workstation 13 may be a personal computer, including a processor 17, a keyboard 18, a mouse 19, and a display 21.

The camera unit 12 includes a video camera 23 which, in the disclosed embodiment, is a monochrome camera. However, the present invention is also suitable for use with a color video camera, or some other type of two-dimensional image detector, such as an infrared detector. Video camera 23 includes a detector 24, which may be a charge coupled device (CCD), or a CMOS image sensor device. The video camera 23 also includes not-illustrated optics of a known type, which focus an image on the detector 24.

The camera unit 12 further includes an image processing section 27. The image processing section 27 includes a video interface circuit 28 which receives the output of the detector 24, and a network interface circuit 29 which facilitates communication across the network 14. The image processing section 27 could also include a modem, in addition to or in place of the interface circuit 29, in order to facilitate communication through telephone lines. The image processing section 27 further includes a processor 33, and a memory such as a hard disk drive 34. The hard disk drive 34 could optionally be replaced with some other type of suitable non-volatile memory, such as a flash memory, or a memory with battery backup.

In the disclosed embodiment, the image processing section 27 is physically disposed within the housing of the camera unit 12. Thus, the camera unit 12 is a standalone device which can coupled directly to a telephone line or a network, such as the network 14. However, it will be recognized that the image processing section 27 could alternatively be implemented with a personal computer which is physically separate from the video camera 23, which has a plug-in video capture card serving as the video interface circuit, and which has a plug-in network interface card serving as the network interface circuit. Further, although the disclosed system has just one video camera 23, it would be possible to use two or more video cameras with a single image processing section.

Figure 2A:
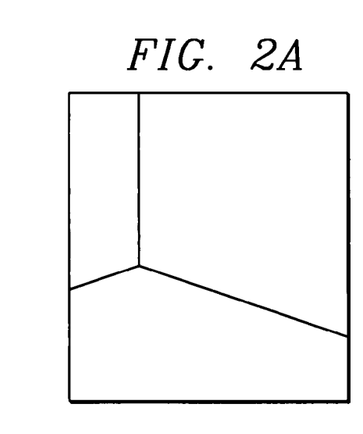
FIGS. 2A, 2B, 2C, 2D, 2E, 2F, 2G and 2H are diagrammatic views of two-dimensional images that represent successive steps carried out by the system of FIG. 1 when processing images obtained from a video camera.
Figure 2B:
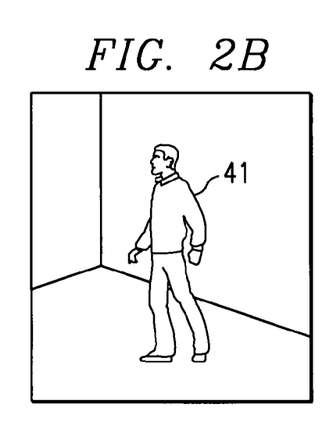

The initial processing of video images by the image processing section 27 will now be described with reference to FIGS. 2A–2H and FIG. 3. More specifically, FIG. 2A is a diagrammatic view of a video image produced by the detector 24 when the video camera 23 is directed toward an area which, in this example, has arbitrarily been selected to be the corner of a room. The video image of FIG. 2A is saved as a reference image. FIG. 2B is a similar video image, obtained from the detector 24 at a later point in time, after an object has been introduced into the image. In this case, the object is a person 41, who has walked into the corner of the room and thus into the field of view of the video camera 23. The video camera 23 is stationary, and thus the single difference between the images of FIGS. 2A and 2B is the presence of the person 41 in FIG. 2B. The presence and movement of the person 41 is detected in the following manner.

Figure 2C:
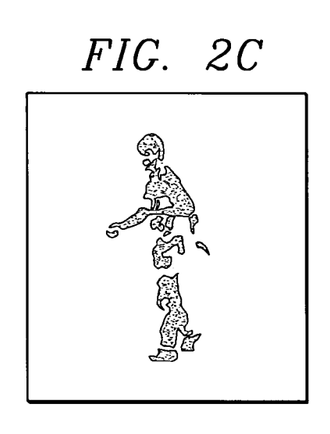
Figure 2D:
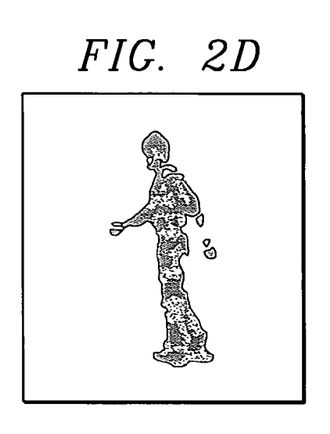

First, the monochrome or gray scale image of FIG. 2B is subtracted from the gray scale image of FIG. 2A, on a pixel-by-pixel-basis. The absolute value of the difference for each pixel is then determined, and the result is the gray scale difference image of FIG. 2C. Then, the difference image of FIG. 2C is sub-sampled in order to reduce the number of pixels, for example to a 128 by 128 or 256 by 256 pixel image. The resulting low-resolution image is shown in FIG. 2D. It will be recognized that it is alternatively possible to sub-sample each of the images of FIGS. 2A and 2B before determining the difference and absolute value for each pixel, which reduces the number of pixels that need to be processed, and therefore reduces the amount of time needed to obtain the image of FIG. 2D.

Figure 2E:
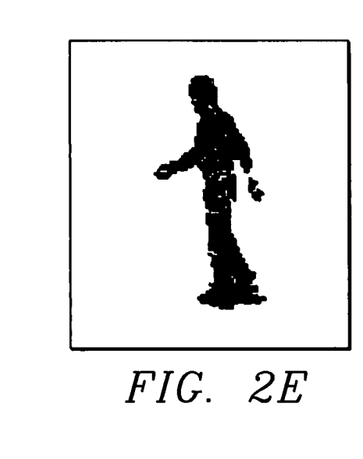

The low-resolution difference image of FIG. 2D is then thresholded. In other words, the gray scale value for each pixel in the image of FIG. 2D is compared to a predetermined threshold, and is then set to be either on or off (black or white), depending on whether the value is above or below the threshold. The resulting threshold image is shown in FIG. 2E. Each pixel in the threshold image of FIG. 2E can be represented by a binary "1" or a binary "0", depending on whether the pixel is considered to be on or off.

Figure 2F:
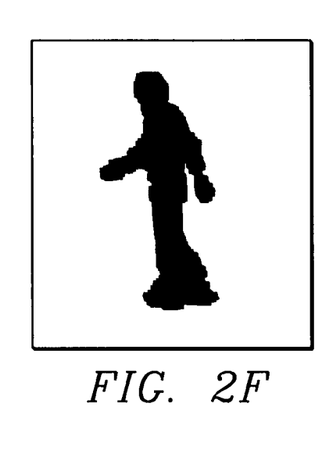

Morphological processing is then carried out on each pixel of the threshold image of FIG. 2E, by first performing a dilate operation, and then performing an erode operation. More specifically, each pixel is processed by viewing it as the center pixel in a three-by-three matrix of pixels. During the dilate operation for each pixel in the threshold image of FIG. 2E, if any one of the eight neighboring pixels in that image is a logic "1", the pixel of interest is set to a logic "1". The resulting dilate image is shown in FIG. 2F. During the subsequent erode operation for each pixel in the dilate image of FIG. 2F, if any one of the eight neighboring pixels in that image is a logic "0", then the pixel of interest is set to a logic "0". The result is the erode image of FIG. 2G.

Figure 2G:
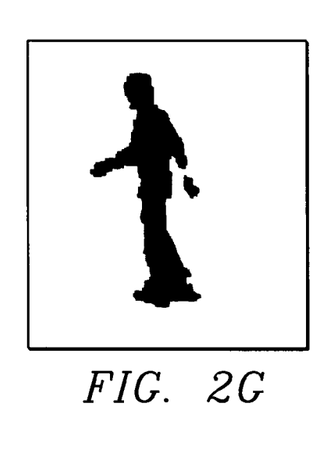

The erode image of FIG. 2G is then analyzed to identify each region of contiguous logic "1" pixels. Each such region of contiguous logic "1" pixels represents a change region, corresponding to an object which has been introduced in the image of FIG. 2B and which was not present in the image of FIG. 2A, such as the person 41. This analysis can be carried out using known techniques, such as run-length encoding followed by connected-component analysis.

Figure 2H:
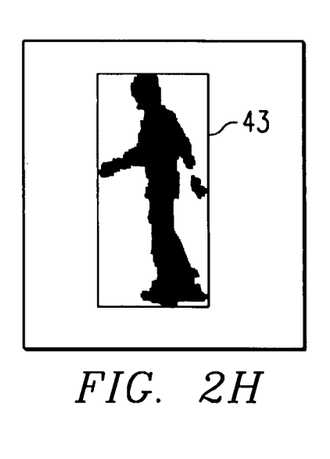

With respect to each detected change region, the image processing section 27 determines a bounding box for the change region. An example of a bounding box is shown at 43 in FIG. 2H. It will be noted that the bounding box 43 is a rectangular box, just large enough to contain the entire change region. That is, no pixel of the change region lies outside the box, but every side of the box touches at least one pixel of the change region.

The above-described image processing is carried out for each image in a succession of images provided by the video camera 23. That is, each of these successive images is processed with respect to the reference image of FIG. 2A, in the same manner that was described above for the image of FIG. 2B.

The image processing system 27 then carries out motion analysis, by tracking movement or non-movement of each identified change region through a succession of the frames or images from the video camera. For purposes of facilitating an understanding of the present invention, one known motion analysis technique will be briefly summarized with reference to FIG. 3. Although it will be recognized that motion analysis in the video images is carried out in two dimensions, for purposes of convenience the diagram of FIG. 3 shows just one dimension.

Figure 3:
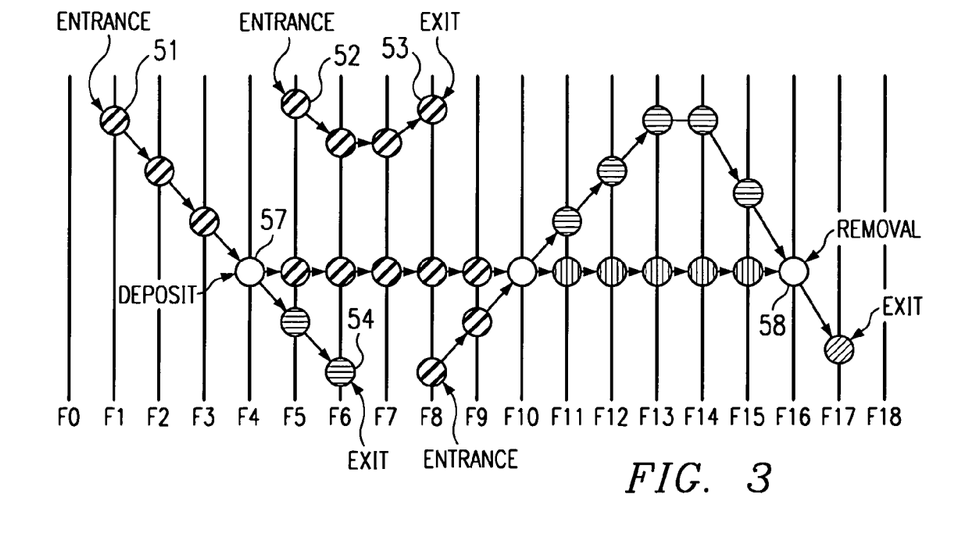
FIG. 3 is a motion analysis diagram indicating how the motion of objects in a video image is analyzed by the system of FIG. 1.

In FIG. 3, the nineteen vertical lines F0 through F18 each represent a respective frame or image in a series of successive images from the video camera 23. In FIG. 3, the horizontal dimension represents time, and the vertical dimension represents one dimension of movement of an object within a two-dimensional image. When an object which was not previously present first appears, for example at 51 or 52, it is identified as an "entrance" or "enter" event. When an object which was previously present is found to no longer be present, for example at 53 or 54, it is designated an "exit" event. If an existing object splits into two objects, one of which is moving and the other of which is stationary, for example as at 57, it is designated a "deposit" event. This would occur, for example, when a person who is carrying a briefcase sets it down on a table, and then walks away.

If a moving object merges with a stationary object, and then continues to move while the stationary object disappears, as at 58, it is designated a "remove" event. This would correspond to a situation where a person walks to a notebook resting on a table, and then picks up the notebook and walks away. Three other types of events, which are not specifically illustrated in FIG. 3, are a "rest" event, a "move" event, and a "lightsout" event. A rest event occurs when a moving object comes to a stop but continues to be present without moving. A practical example is a situation where the objects being monitored are vehicles in a parking lot, and a car pulls into a parking space and thereafter remains stationary. A move event occurs when a detected object which has been stationary begins moving again, for example when a car that has been parked begins moving. A "lightsout" event occurs when the entire detected image suddenly changes, for example when the lights in a monitored room are turned out and the room becomes dark. A "lightsout" event can be detected without all of the image processing described above in association with FIGS. 2 and 3.

It is optionally possible to also carry out an identification analysis, in an attempt to identify a detected object. For example, with a small amount of knowledge about the topography of the monitored area, the image processing system 27 can use the position in the image of the midpoint of the lower side of the object's bounding box in order to identify how far the object is from the camera. Then, knowing how tall a person that far from the camera would be, the image processing system 27 can evaluate the vertical height of the bounding box in the image, in order to determine whether the object generating the change region is tall enough to be a person. If the object is sufficiently tall to be a person, it can be assumed that it is a person.

If the object is not sufficiently tall to be a person, then the image processing section 27 can carry out an object analysis procedure, where the image of the object is compared to stored images of common objects, such as briefcases, notebooks, boxes, and computer monitors. If the object is not be specifically identified through this approach, then it is ultimately identified as an "unknown" object.

Figure 4:
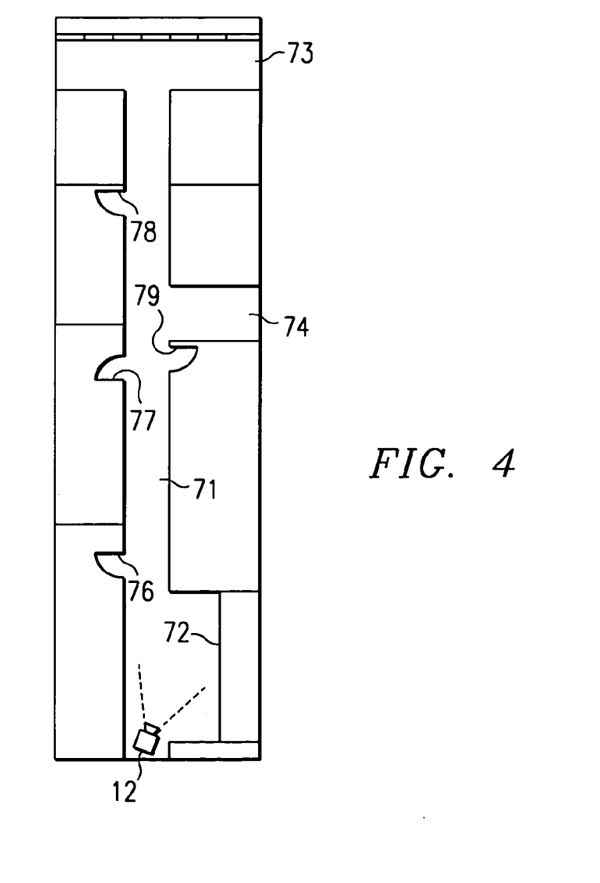
FIG. 4 is a diagrammatic top view of part of a floor plan of a building in which the system of FIG. 1 can be utilized.

In order to facilitate an understanding of the present invention, a specific exemplary application for the system 10 of FIG. 1 will now be disclosed. However, it will be recognized that there are numerous other applications and environments in which the system 10 of FIG. 1 could be utilized. With respect to the exemplary application, FIG. 4 is a diagrammatic top view of a portion of a building which has a long hallway 71 with an alcove 72 near one end. The camera unit 12 of FIG. 1 is stationarily mounted just below the ceiling and at one end of the hallway 71, so that it looks down the hallway 71 and slightly to the right. The camera unit 12 can thus observe the hallway 71 and the alcove 72. At its far end, the hallway 71 dead-ends into a transverse further hallway 73. Yet another transverse hallway 74 extends off to the right from hallway 71, at a location intermediate the alcove 72 and the hallway 73. There are three doors 76–78 disposed at spaced locations along the left side of the hallway 71. A single door 79 is provided along the right side of the hallway 71, adjacent the hallway 74 and on a side thereof nearest the camera unit 12.

Figure 5:
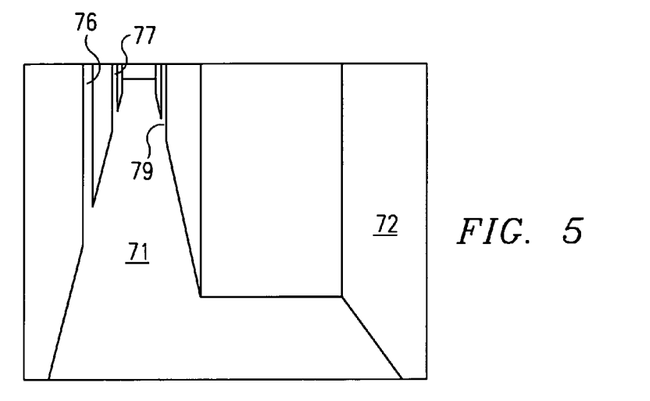
FIG. 5 is a diagrammatic view of a reference image provided by the system of FIG. 1 for the building of FIG. 4.
Figures 6, 7:
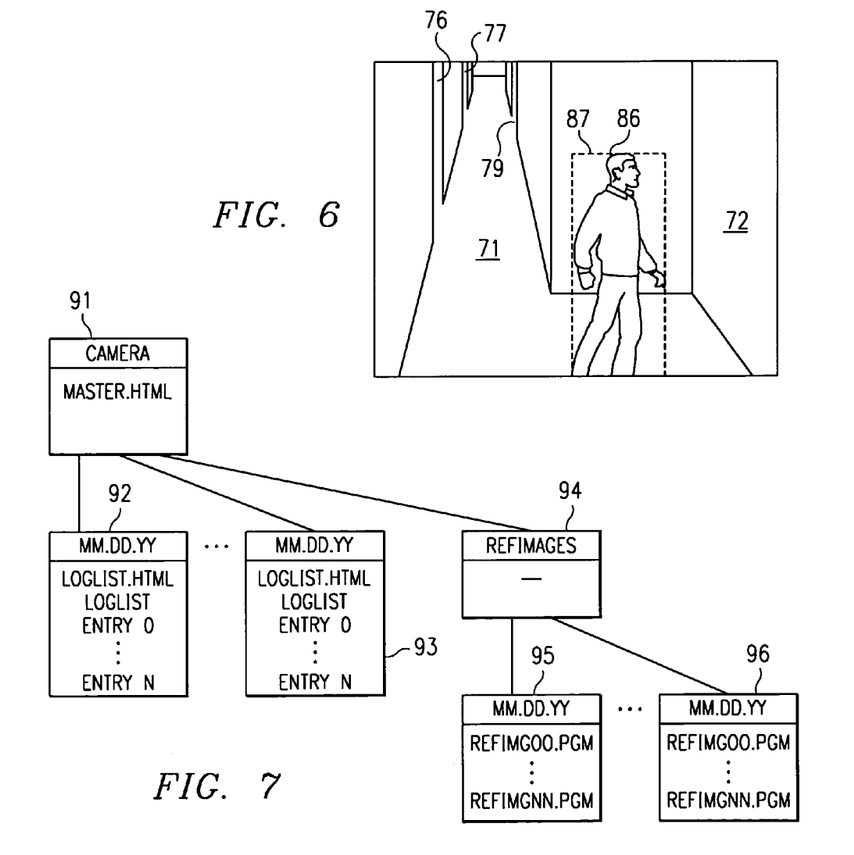
FIG. 6 is a diagrammatic view of a video image which is similar to the image of FIG. 5, but which shows the presence of a person.
FIG. 7 is a diagrammatic view of a directory structure which is used on a hard disk drive in the system of FIG. 1.

FIG. 5 is a diagrammatic view of a video image which was obtained from the camera unit 12 in the environment of FIG. 4, and which thus shows the hallway 71 and the alcove 72. For purposes of discussion, it is assumed that the image of FIG. 5 has been saved as a reference image, analogous to the reference image discussed above in association with FIG. 2A. FIG. 6 is a diagrammatic view of a further video image from the camera unit 12, but after the appearance in the monitored area of an object 86 which was not present in the reference image of FIG. 5.

In this case, the object 86 is a person, who entered the hallway 71 at the far end, and then walked down the length of the hallway 71 to the alcove 72. After the camera unit generated the video image of FIG. 6, the person 86 continued down the hallway 71 toward the camera unit 12, and then walked under the camera unit so as to disappear from the field of view of the camera unit. During the time that the person 86 was in the field of view of the camera unit 12, the camera unit generated a succession of video images as the person walked down the hall 71. A selected one of these video images is shown in FIG. 6. Each of the video images in this succession of images was processed relative to the reference image of FIG. 5, in a manner analogous to that described above in association with FIG. 2. In association with the processing of each such image, the system determines for each image a bounding box around the change region which corresponds to the person 86. The bounding box for the person 86 in the image of FIG. 6 is shown at 87.

The image processing section 27 of FIG. 1 does not save each of the numerous images of the person 86 which are obtained while the person walks down the hallway 71. While some known systems do this, it requires an extensive amount of memory to store all this video information. Instead, the system 10 stores just selected information, as discussed below.

More specifically, the image processing section 27 has already stored on the hard disk drive 34 the reference image of FIG. 5. In the disclosed embodiment, the reference image of FIG. 5 is first sub-sampled, and then the resulting low-resolution version of the image is stored on the hard disk drive 34, in order to reduce the amount of storage space needed for each such reference image. Objects which enter the observed area are of primary interest, rather than the observed area itself, and a low-resolution image of the observed area is thus sufficient for most applications.

For each detected object such as the person 86, the image processing section 27 also determines the Cartesian coordinates within each image of the midpoint of the lower side of the bounding box for that detected object. This information is saved on the hard disk drive. In other words, for each detected object, a Cartesian coordinate pair for that object is saved for each video image in which the object is present. As to a given object, the set of Cartesian coordinate pairs for all of the images in which that object was present can serve as a trace of the movement of the object within the observed area, as will be discussed in more detail later.

The image processing section 27 also saves a selected image of each detected object. In the disclosed embodiment, this selected image is just a portion of the overall image from the video camera 23. In particular, it is the portion of the image which is located within the bounding box for the object of interest. Thus, if the selected image for the person 86 was derived from the video image of FIG. 6, it would be the portion of that image within the bounding box 87. This selected image or image portion is stored at full resolution, in order to have a top-quality view of the detected object. This is because a top-quality view will often be useful at a later point in time, for example to facilitate identification of a particular individual. Since the selected image is just a portion of the overall video image, the amount of memory needed to store the selected image at full resolution is often less than the amount of memory which would be needed to store the overall video image at a reduced resolution.

The selection of the particular image to be saved is an automatic determination, which is effected with simple heuristics. In most applications, the objects of primary interest are humans, and it is therefore desirable to favor selection of an image in which the person is facing generally toward the camera unit 12, and is reasonably close to the camera unit 12. In this regard, if the lower side of the bounding box is moving downwardly in successive images, it is assumed that the person is moving toward and facing the camera. On the other hand, if the lower side of the bounding box is not moving downwardly or upwardly, the new view will nevertheless be favored over a prior view, if the subject appears to be larger, as reflected by an increase in the vertical size of the bounding box.

Thus, when an object such as a person first appears, the image processing system 27 temporarily saves the first video image containing the person, and tentatively designates this image as the selected image. Then, in each successive image, the image processing section 27 checks to see whether the lower side of the bounding box in the current image is lower than the lower side of the bounding box in the tentatively selected image. If it is, then the prior image is discarded and the current image is tentatively designated as the selected image.

On the other hand, if the lower side of the bounding box for the object is found to have the same vertical position in the current image as in the tentatively selected prior image, then the section 27 checks to see if the vertical height of the bounding box in the current image is larger than the vertical height of the bounding box in the tentatively selected image. If so, then the prior image is discarded and the current image is tentatively designated as the selected image.

When the object eventually exits the observed area, the image processing section 27 takes the tentatively selected video image, and saves on the hard disk drive 34 the portion of that video image which is within the bounding box. As discussed above, this portion of the image is saved at full resolution.

Although the disclosed embodiment uses the foregoing selection criteria in order to favor facial close-ups of humans, it will be recognized that other applications may require other selection criteria. For example, if the camera unit 12 was being used to monitor vehicles, and if it was desirable to favor close-ups of the rear license plates of the vehicles, the selection criteria could be adjusted to achieve this.

In association with each detected object, the image processing section 27 also saves on the hard disk drive 34 certain other information, including a human-readable timestamp which indicates the date and time that the object was detected, the name of the disk file containing the reference image which was in use while the object was present in the observed area, and a keyword indicating how the object entered the observed area. As to the latter, the allowable keywords in the disclosed embodiment are "enter", "deposit" and "other", but it will be recognized that there could be additional allowable keywords, or fewer allowable keywords.

Over time, changes may occur in the background of the observed area. For example, the ambient lighting may change, due to variations in the sunlight entering through windows, opening and closing of window blinds, opening and closing of interior doors, actuation and deactuation of interior lighting, and so forth. Similarly, people may deposit, remove or reposition objects in the observed area. Each such change creates a permanent region of difference between the original reference image and each current video image. Absent a periodic update of the reference image, the system will continue to track these difference or change regions as detected objects. Lighting changes would thus be treated as detected objects, resulting in the storage of images which are not really of interest, and which simply waste memory on the hard disk drive 34.

In order to avoid this, the image processing section 27 checks for a condition in which nothing in the observed area has changed for a specified time interval, such as twenty seconds. In response to detection of this condition, the image processing section 27 terminates the tracking of all detected objects which were being actively tracked, saves the current video image as a new reference image, and then resumes monitoring of the observed area using the new reference image. In general, humans almost never remain completely still for more than a second or two, and there is thus little risk of selecting as the reference image a video image which has a human in it.

With reference to FIG. 1, the image processing section 27 of the camera unit 12 has been designed so that it is Internet-compatible, and in particular is compatible with Internet standards commonly known as the World Wide Web (WWW). As a result, the camera unit 12 can be coupled directly to the network 14, and the stored information which was discussed above can be accessed and viewed by a person using a web browser on a remote unit such as the workstation 13. To facilitate this, the image processing section 27 stores the results of its monitoring activities on the hard disk drive 34 in a manner which will now be described with reference to FIG. 7.

More specifically, FIG. 7 shows the directory organization of a portion of the hard disk drive 34. In FIG. 7, the rectangular boxes 91–96 are each a diagrammatic representation of respective directory. These directories store the information relating to monitoring activities of the image processing section 27. The directory 91 is a subdirectory of a not-illustrated root directory, the directories 92–94 are subdirectories of the subdirectory 91, and the directories 95 and 96 are subdirectories of the directory 94.

The subdirectory 91 contains a file MASTER.HTML, and the subdirectories 92 and at 93 each contain a respective file named LOGLIST.HTML. The MASTER.HTML and LOGLIST.HTML files are each a WWW-compatible file in hypertext mark-up language (HTML) format, and facilitate access to other information stored in the directory structure of FIG. 7. The MASTER.HTML file has hypertext links to each of the LOGLIST.HTML files, and the LOGLIST.HTML files are each an HTML shell which invokes an applet that facilitates access to files within the directory containing that particular LOGLIST.HTML file.

The directory 92 corresponds to a single day in which the camera unit 12 of FIG. 1 was operational. When the camera unit 12 first begins monitoring a given area, the subdirectory 91 exists, but the subdirectories 92 and 93 do not exist. During the first day of monitoring, the image processing section 27 creates the subdirectory 92, and uses it to store information from that day's monitoring activities. Upon commencing each subsequent day of monitoring, the image processing section 27 creates a similar additional subdirectory, one of which is shown at 93. The name of each such subdirectory is in the format MM.DD.YY, and identifies the month, day and year for which the directory contains information.

Each of the subdirectories 92–93 has therein the above-mentioned LOGLIST.HTML file. Further, each such subdirectory includes a LOGLIST file, which is a summary list identifying all the log entries for the day in question, each log entry corresponding to a respective detected object. Each subdirectory also includes, for each log entry in its LOGLIST file, a separate file with the name format ENTRYX, where X is an integer. Each ENTRYX file contains details associated with the specific detected object, including the name of the file which contains the reference image that was in effect when the object was present, the keyword indicating how the object entered the scene, the series of Cartesian coordinate pairs which trace the path of movement of the object within the image, the selected image of the object in a full-resolution PGM image format, and two Cartesian coordinate pairs which respectively identify the position in the video image of two opposite corners of the bounding box for the selected image.

The summary information in the LOGLIST file includes two elements for each detected object, namely a timestamp representing the date and time when the corresponding object was detected, and the name of the ENTRYX file containing details about that detected object. In the disclosed embodiment, this information in the LOGLIST file is in an ASCII format.

The subdirectories shown at 95 and 96 in FIG. 7 each correspond to a respective day, and each contain all of the reference images used during that day. More specifically, when the camera unit 12 first begins monitoring a selected area, the subdirectory 94 will exist, but the subdirectories 95 and 96 will not yet exist. During the first day of monitoring, the subdirectory 95 is created, and is used to store all of the reference images for that day. At the beginning of each subsequent day of monitoring, a new subdirectory is created, one of which is shown at 96.

Each of the subdirectories 95 and 96 has a name format of MM.DD.YY, representing the date corresponding to the information stored in the subdirectory. Each of the subdirectories 95 and 96 contains a plurality of files with the name format REFIMGXX.PGM, where XX is a unique integer. Each REFIMGXX.PGM file contains a respective reference image. Each time a new reference image is saved during the day, a new REFIMGXX.PGM file is created, and is named using the next highest unused XX integer.

Figure 8:
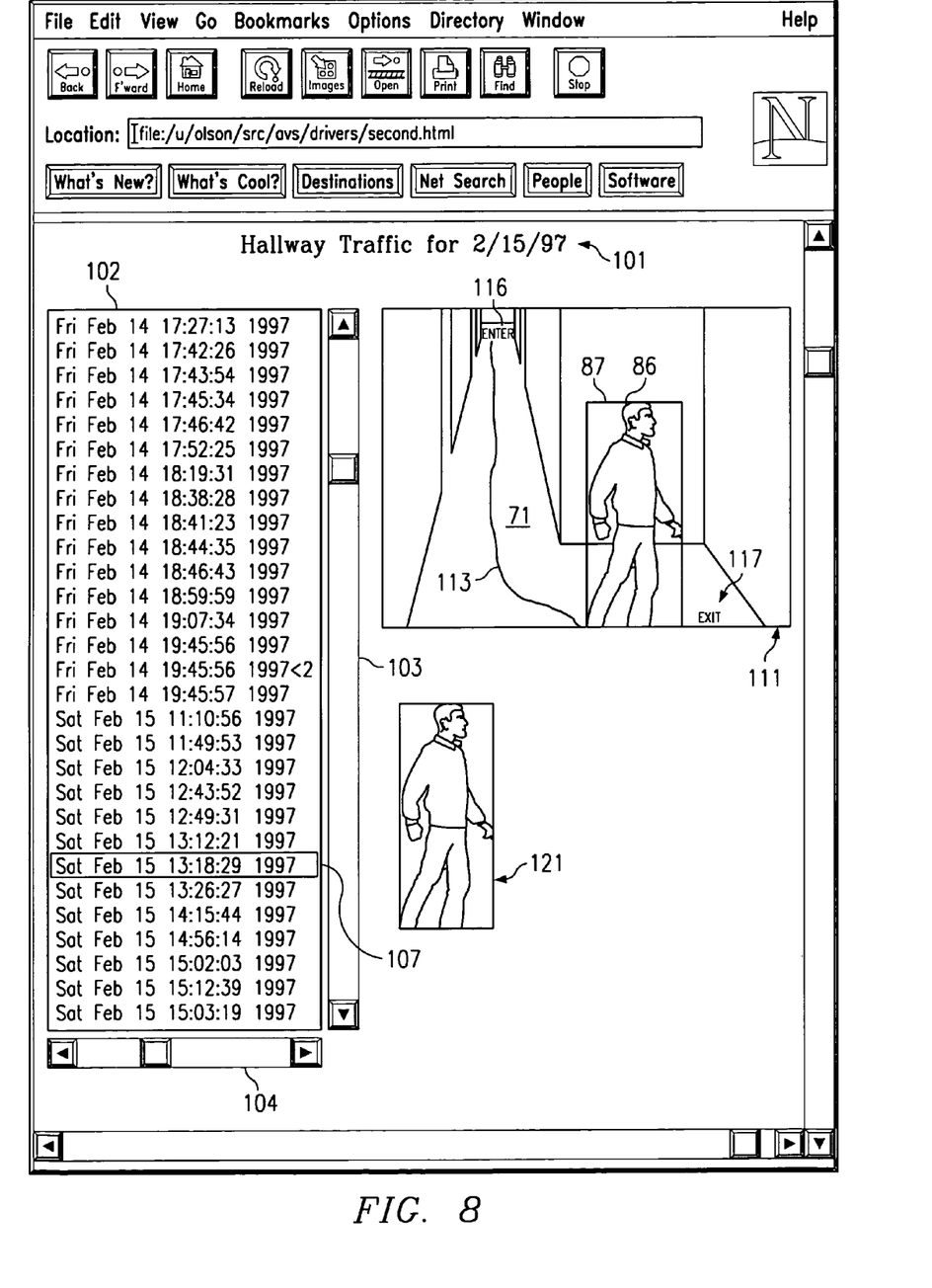
FIG. 8 is a diagrammatic view of a display presented on the screen of a computer monitor which is a component of the system of FIG. 1.

FIG. 8 is a diagrammatic view of the display 21 of FIG. 1 when an operator is using the workstation 13 to observe information stored on the hard disk drive 34 by the image processing section 27. In FIG. 8, the operator is using a web browser program which is sold under the tradename NETSCAPE by Netscape Communications Corporation of Mountainview, Calif. However, it will be recognized that some other equivalent web browser could alternatively be used. In FIG. 8, the user has invoked the WWW capabilities of the Internet to access the WWW-compatible file MASTER.HTML in the directory 91 (FIG. 7), which in turn has used the various LOGLIST.HTML files in the subdirectories 92–93 to access information in each of the respective LOGLIST files. The MASTER.HTML file may optionally require an operator to provide a valid password before giving the operator access to the information stored on the hard disk drive 34.

At the top of the displayed web page is a title 101, which is provided by the MASTER.HTML file, and which reflects the particular installation or application. Along the left side of the page is a scroll box 102, in which the MASTER.HTML and LOGLIST.HTML files display a list of the timestamps from all of the LOGLIST files, each timestamp including both a date and a time. Vertical and horizontal scroll bars 103 and 104 are provided if the number of timestamp entries or the length of any single timestamp entry is larger than can be displayed at one time within the scroll box 102. In the scroll box 102, the operator has highlighted one entry, which corresponds to a detected object that was present at the specified time on Feb. 15, 1997.

To the right of the scroll box 102, information from the ENTRYX file corresponding to the selected log entry is displayed. More specifically, a video image 111 is presented, which represents the event that was discussed above in association with FIGS. 5 and 6, namely the detection and tracking of the person 86. The image 111 is created by first retrieving and displaying the REFIMGXX.PGM file corresponding to the selected log entry 107. Then, the selected image corresponding to the log entry 107 is retrieved from the ENTRYX file, sub-sampled so as to have the same resolution as the reference image, and displayed in place of the corresponding portion of the reference image. Thereafter, the bounding box 87 associated with the selected image is superimposed on image 111.

Then, using the series of Cartesian coordinate pairs stored in the corresponding ENTRYX file, a trace 113 of the movement of the detected object is overlaid on the image 111. As discussed above, the trace 113 represents the movement of the midpoint of the lower side of the bounding box 87, and thus is an accurate representation of where the person 86 walked. Then, labels are superimposed on the image 111, as at 116 and 117, based on the information stored in the ENTRYX file. In FIG. 8, the label 116 is the word "ENTER", and indicates that the person 86 entered the observed area at approximately the location of this label, or in other words at the far end of the hallway 71. The label 117 is the word "EXIT", and indicates where the person 86 exited the observed area, in this case by continuing down the hallway 71 and underneath the camera unit 12. The bounding box 87, trace 113 and/or labels 116 and 117 may optionally be displayed in one or more different colors, so that they are more readily visible.

To the right of the scroll box 102, and below the image 111, the image processing section 27 displays a further image 121, which is smaller than the image 111. The image 121 corresponds to the portion of the image 111 within the bounding box 87, but is displayed at full resolution rather than at the lower resolution used for the larger image 111. Thus, if an attempt is being made to identify a particular person, the features of that person may be more clearly visible in the high resolution image 121 than in the reduced resolution image 111. Since the saved image 121 was selected using the criteria discussed above, which are intended to favor facial close-ups of humans, it will be noted that the face of the person 86 is visible, and that the person is closer to the camera than would have been the case if the system had simply stored the first image in which the person 86 had been detected, without attempting to apply any selection criteria.

Figure 9:
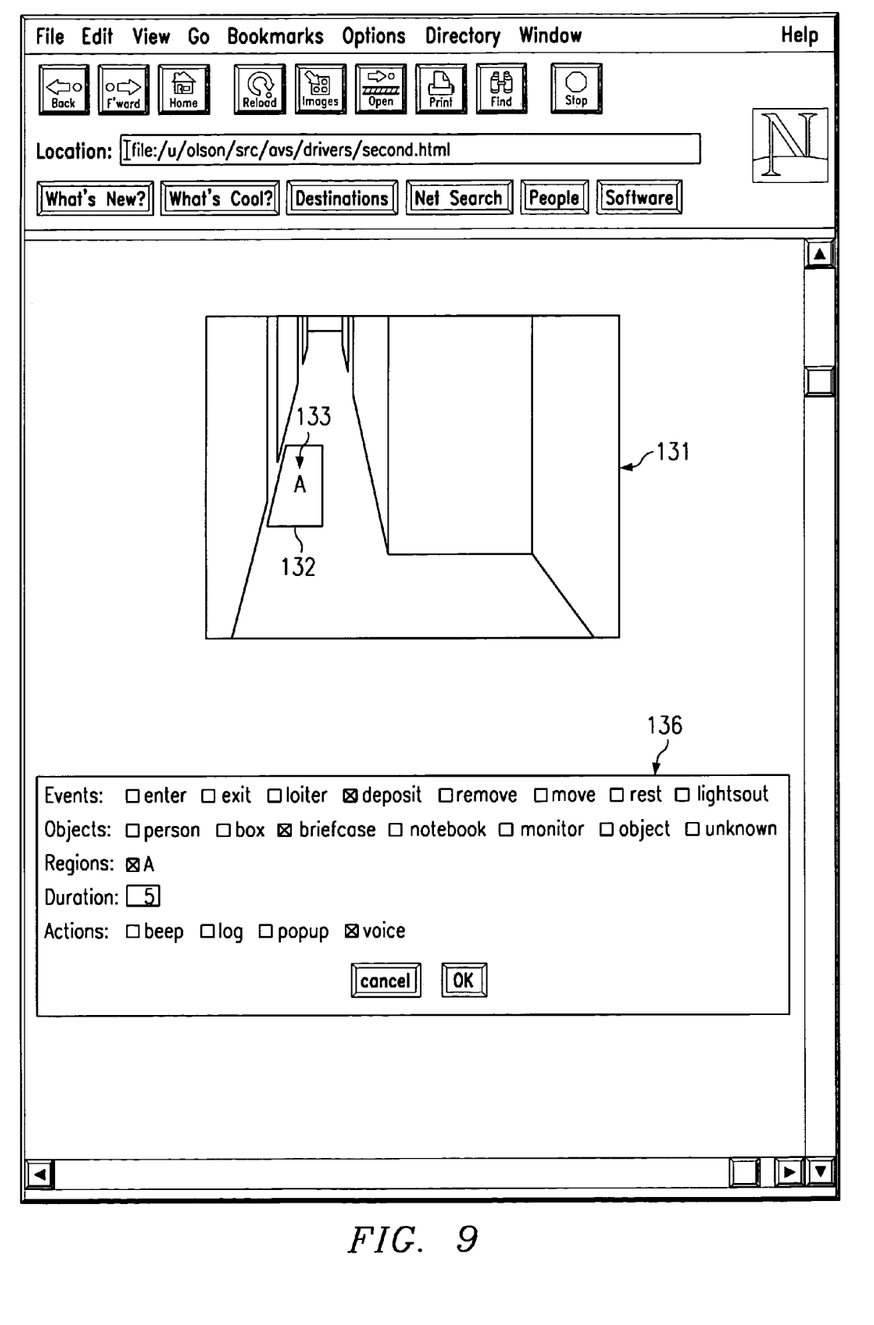
FIG. 9 is a diagrammatic view similar to FIG. 8 of a display presented on the screen of the computer monitor of FIG. 1.

FIG. 9 is a diagrammatic view similar to FIG. 8, but showing a different web page provided by the MASTER.HTML file. This web page includes an image 131, which is the current reference image, for example the reference image shown in FIG. 5. The user can then use a mouse to identify one or more regions in this image, for example the region 132. The user may define the region by using the mouse pointer to identify the corners of the region, while clicking on each corner. Each time the user defines a region, it is automatically given a label, which is a letter. For example, the region 132 in FIG. 9 has been given the label "A". As discussed above, the image processing section 27 maintains a history of the movement of the midpoint of the lower side of the bounding box for each object. If this midpoint were to remain within a given region, such as the region 132, for a predefined period of time, it might represent loitering, and could be detected by the image processing section 27.

The web page of FIG. 9 also includes an event selection box 136, which the operator can use to indicate that the imaging processing section 27 is to check for a specified event, and to indicate what action is to be taken if the specified event occurs. In this regard, the operator can use a mouse to select one of several events identified in box 136, including an enter event, an exit event, a loiter event, a deposit event, a remove event, a move event, a rest event, and a lightsout event. The event selection box 136 allows the user to optionally restrict the monitoring for the specified event to certain types of detected objects, including a person, a box, a briefcase, a notebook, a computer monitor, any type of object, or just an unknown object. Event selection box 136 also allows the user to restrict the monitoring event to a particular region by identifying its label letter, such as the region 132 identified by the label letter "A".

For certain events, the event selection box 136 allows the user to specify a time duration in seconds. For example, if the user is instructing the system to monitor for a loiter event within a specified region, the user may specify that the loiter event is to be detected only if the specified object remains within the specified region for a period of at least five seconds. The event selection box 136 also allows the operator to specify the action to be taken if the specified event occurs, including an audible beep, the creation of a log entry on the hard disk drive 34, a pop-up window on the display 21 of the workstation 13, or a synthesized voice announcement which indicates that the event of interest has occurred, such as a synthesized announcement of the word "loiter". It will be recognized that the event selection box 136 could be modified to allow the identification of other events, objects, conditions, or actions. For example, actions could also include making a phone call to a specified number such as that of a security agency, or sending an electronic mail message to a specified electronic mail address.

The present invention provides a number of technical advantages. One such advantage is that, by periodically saving reference images, by saving these reference images at a reduced resolution, by saving just selected images of objects of interest, and by saving just portions of the overall image, the amount of memory needed to store images is greatly reduced in comparison to known systems. A related advantage is that the amount of stored information which an operator would have to review in response to the occurrence of an event is greatly reduced in comparison to known systems. A further advantage is that the available information is presented with timestamp information, so that an operator can rapidly identify the events of interest within a time frame of interest, and can quickly and easily review those events.

Yet another advantage is the storage of a trace representing the movement of a detected object, so as to later provide a readily understandable visible image of the object's movement, without storing numerous video images corresponding to the entire time interval while the detected object was present in an observed area. Another advantage is that the use of a web browser to access information logged by the system permits a person to access the information from virtually anywhere that a computer is available, including a WWW-compatible cellular phone.

Another advantage results from the fact that the selection of an image to save is based on criteria which are intended to optimize the image, for example to make it likely that a detected person is facing and close to the camera. Another advantage is that the disclosed system can be a self-contained camera unit which is WWW-compatible. A further advantage is that the disclosed system is more reliable than certain known technologies, such as known systems having a video cassette recorder (VCR) that is subject to mechanical breakdowns and that has heads which need to be periodically cleaned.

Although one embodiment has been illustrated and described in detail, it will be understood that various changes, substitutions and alternations can be made thereto without departing from the scope of the present invention. For example, as mentioned above, the disclosed embodiment has a camera unit which includes both a video camera and image processing circuitry, but a similar system could be implemented with a video camera and a physically separate personal computer. Further, the disclosed embodiment has one video camera, but it will be recognized that a single image processing circuit could support two or more video cameras.

In addition, the disclosed embodiment has been discussed in the context of one specific exemplary application, which involves the monitoring of activity in a hallway. However, there are many other applications to which the present invention could be applied. For example, a working couple might place a camera unit in their home, and could use the Internet to consult its LOGFILES from work, in order to verify that their children arrived safely home from school. A camera unit located over the front door of a residence could store pictures of everyone who comes to the door and, like a telephone answering machine, would give the owners a log of who tried to contact them while they were away. A system at a vacation home could telephone the owner and send an image of someone who is in the home, so that the owner could inspect the image and take the appropriate action.

A system located at a traffic intersection could store one or more selected images covering an automobile accident. For example, if it was detected through motion analysis that any vehicle decelerated more rapidly than would be possible by braking, it could be interpreted as a possible accident, and the system could respond by storing a selected image from a point in time approximately one-half second before the accident. In fact, the system could select and save several different images from a time interval just before the accident.

Although the disclosed embodiment uses a selection criteria optimized for detecting humans, a different image selection criteria could be used for optimal results in other applications. For example, if the system were monitoring a parking lot and it was desirable to store a selected image showing a license plate on the rear of a vehicle, the criteria would favor images in which the vehicle was close to the camera but moving away from the camera rather than moving toward the camera. Although the disclosed embodiment stores reference images and selected images with different resolutions, it will be recognized that all images could be stored with the same resolution.

Other changes, substitutions and alterations are possible without departing from the spirit and scope of the present invention, as defined by the following claims.

What is claimed is:
1. A method of monitoring an area, comprising the steps of:
   periodically detecting an image of the area;
   identifying and tracking a moving object in a succession of the detected images;

automatically selecting a portion of a single image of the succession of detected images for each identified moving object using selection criteria;

saving the selected portion of the single image of the succession of detected images for each identified object; and discarding and not saving detected images of the succession of the detected images other than said single image of each identified object.

2. A method according to claim 1, wherein said step of automatically selecting is carried out by using image selection criteria which are intended to lead to the selection of an image in which the face of a detected person is visible and large.

3. A method according to claim 2, wherein said step of automatically selecting includes the steps of:

saving one of the detected images as a reference image;

carrying out said step of identifying by evaluating images detected subsequent to the reference image in order to identify therein each change region where the evaluated image differs from the reference image;

determining a bounding box subset of the single image for a given change region in each image of a set of images in which the given change region appears; and selecting the selected portion of the single image for the given change region by discarding images from the set in which a lowermost side of the bounding box is higher than in other images of the set, and by selecting from the remaining images of the set an image in which a size of the bounding box is larger than in the other remaining images of the set.

4. A method according to claim 1, wherein said step of automatically selecting is carried out using image selection criteria which cause a current image to be selected over a prior image if a lowermost point of a detected change region is lower in the current image than in the prior image.

5. A method according to claim 4, wherein said step of automatically selecting is carried out using image selection criteria which cause a current image to be selected over a prior image if a detected change region has increased in size relative to a prior image.

6. A method according to claim 1, wherein said selecting step is carried out in response to detection of the absence of a previously detected object.

7. A method according to claim 1, wherein said selecting step is carried out in response to detection of a situation in which an object has remained within a predefined region of the area for a specified time interval.

8. A method according to claim 1, wherein said selecting step is carried out in response to a determination that a previously moving object has become stationary.

9. A method according to claim 1, wherein said selecting step is carried out in response to a determination a previously stationary object has started moving.

10. A method according to claim 1, wherein said saving step is carried out by determining a bounding box subset of the single image just large enough to completely contain a corresponding detected object and saving a portion of a detected image corresponding to the bounding box.

11. A method according to claim 10, including the step of saving one of the detected images as a reference image at a first resolution, and wherein said step of saving the selected portion of the single image is carried out by saving the bounding box enclosing the selected portion of the single image at a second resolution which is higher than the first resolution.

12. A method according to claim 1, including the step of saving one of the detected images as a reference image having a first resolution, wherein said step of saving the selected portion of the single image is carried out by determining a bounding box subset of the single image just large enough to completely contain a corresponding detected object and saving at a second resolution the bounding box enclosing the selected portion of the single image, the second resolution being greater than the first resolution, and including the step of displaying the reference image at the first resolution, displaying the bounding box enclosing the selected portion of the single image within the reference image at the first resolution, and displaying the bounding box enclosing the selected portion of the single image separately from the reference image and at the second resolution.

13. An apparatus for monitoring an area, comprising:

a detector which is operative to periodically detect an image of the area; and an image processing section which is responsive to the detector, said image processing section being operative to:

identify and track a moving object in a succession of the detected images;

automatically select a portion of a single image of the succession of detected images for each identified object utilizing selection criteria;

save the selected portion of the single image of the succession of detected images for each identified object; and discard and not save detected images other than said single image of the succession of detected images for each identified object.

14. An apparatus according to claim 13, wherein:

said image processing section being further operative to:

use image selection criteria which are intended to lead to the selection of an image in which the face of a detected person is visible and large.

15. An apparatus according to claim 14, wherein:

said image processing section being further operative to:

save one of the detected images as a reference image;

identify a moving object by evaluating images detected subsequent to the reference image in order to identify therein each change region where the evaluated image differs from the reference image;

determine a bounding box subset of the selected image for a given change region in each image of a set of images in which the given change region appears; and select the selected portion of the single image for the given change region by discarding images from the set in which a lowermost side of the bounding box is higher than in other images of the set, and by selecting from the remaining images of the set an image in which a size of the bounding box is larger than in the other remaining images of the set.

16. An apparatus according to claim 13, wherein:

said image processing section being further operative to:

automatically select an image using image selection criteria which cause a current image to be selected over a prior image if a lowermost point of a detected change region is lower in the current image than in the prior image.

17. An apparatus according to claim 16, wherein:

said image processing section being further operative to:

automatically select an image out using image selection criteria which cause a current image to be selected over a prior image if a detected change region has increased in size relative to a prior image.

18. An apparatus according to claim 13, wherein:
said image processing section being further operative to:
select an image in response to detection of the absence of a previously detected object.

19. An apparatus according to claim 13, wherein:
said image processing section being further operative to:
select an image in response to detection of a situation in which an object has remained within a predefined region of the area for a specified time interval.

20. An apparatus according to claim 13, wherein:
said image processing section being further operative to:
select an image in response to a determination that a previously moving object has become stationary.

21. An apparatus according to claim 13, wherein:
said image processing section being further operative to:
select an image in response to a determination a previously stationary object has started moving.

22. An apparatus according to claim 13, wherein:
said image processing section being further operative to:
save said selected portion of the single image by determining a bounding box subset of the single image just large enough to completely contain a corresponding detected object and saving a portion of a detected image corresponding to the bounding box.

23. An apparatus according to claim 22, wherein:
said image processing section being further operative to:
save one of the detected images as a reference image at a first resolution; and
save the selected portion of the single image by saving a bounding box enclosing the selected portion of the single image at a second resolution which is higher than the first resolution.

24. An apparatus according to claim 13, further comprising:
a display device; and
wherein said image processing section being connected to the display device and being further operative to:
save one of the detected images as a reference image having a first resolution;
save the selected portion of the single image by saving a bounding box subset of the single image enclosing a corresponding detected object at a second resolution which is higher than the first resolution;
display via said display device said reference image at the first resolution and said bounding box enclosing the selected portion of the single image within said reference image at said first resolution, and
display via said display device said bounding box separately from said reference image at said second resolution.

25. A method of monitoring an area, comprising the steps of:
periodically detecting an image of the area;
identifying and tracking a moving object in a succession of the detected images;
automatically selecting a portion of single image of the succession of detected images for each identified object using selection criteria;
saving the selected portion of the single image of the succession of detected images for each identified object; and
discarding and not saving detected images other than said single image of the succession of detected images for each identified object; and
automatically saving a series of Cartesian coordinate pairs which identifies the path of movement of the object, said information being retained after the object is no longer present in newly detected images.

26. A method according to claim 25, including the steps of saving an identification of an event associated with the detected object, saving one of the detected images as a reference image, displaying the reference image, displaying on the reference image the path of movement of the object, and displaying on the reference image the identification of the event at a location on the reference image corresponding to a location of the event.

27. An apparatus according to claim 25, further comprising:
a display device;
wherein said image processing section being connected to said display device and being further operative to:
save an identification of an event associated with said detected object;
save one of the detected images as a reference image; and
display via said display device said reference image, said path of movement of the object within said reference image, and said identification of said event on said reference image at a location on the reference image corresponding to a location of the event.

28. An apparatus for monitoring an area, comprising:
a detector which is operative to periodically detect an image of the area; and
an image processing section which is responsive to the detector and which is operative to:
identify and track a moving object in a succession of the detected images;
save the selected portion of the single image of the succession of detected images for each identified object; and
discard and not save detected images other than said single image of the succession of detected images for each identified object;
automatically save a series of Cartesian coordinate pairs which identifies the path of movement of each moving object, and to retain the information after the moving object ceases to be present in current detected images.

* * * * *